United States Patent [19]
Kreft

[11] Patent Number: 6,008,993
[45] Date of Patent: Dec. 28, 1999

[54] CHIP CARD WITH CHIP SUPPORT ELEMENT AND COIL SUPPORT ELEMENT

[75] Inventor: Hans-Diedrich Kreft, Dassendorf, Germany

[73] Assignee: Angeuandte Digital Electronik GmbH, Dassendorf, Germany

[21] Appl. No.: 08/860,846

[22] PCT Filed: Nov. 23, 1995

[86] PCT No.: PCT/DE95/01677

§ 371 Date: Jun. 9, 1997

§ 102(e) Date: Jun. 9, 1997

[87] PCT Pub. No.: WO96/18974

PCT Pub. Date: Jun. 20, 1996

[30] Foreign Application Priority Data

Dec. 11, 1994 [DE] Germany ............................ 44 43 980

[51] Int. Cl.⁶ ............................ H01L 23/051; H05K 1/18
[52] U.S. Cl. ........................ 361/737; 361/761; 361/764; 361/782; 361/803; 235/491; 235/492; 257/679
[58] Field of Search .................................... 361/737, 749, 361/760, 761, 763, 764, 768, 774, 777, 782, 783, 784, 803; 336/200, 205, 208; 174/254, 260, 261; 439/65, 67, 69, 71, 74, 83, 84; 235/492, 491; 257/679

[56] References Cited

U.S. PATENT DOCUMENTS

| | | |
|---|---|---|
| 5,057,679 | 10/1991 | Audic et al. ............................ 235/492 |
| 5,519,201 | 5/1996 | Templeton, Jr. et al. ............... 235/492 |
| 5,598,032 | 1/1997 | Fidalgo ................................... 257/679 |
| 5,612,532 | 3/1997 | Iwasaki ................................... 235/492 |
| 5,710,458 | 1/1998 | Iwasaki ................................... 257/679 |
| 5,880,934 | 3/1999 | Haghiri-Tehrani ...................... 361/737 |

FOREIGN PATENT DOCUMENTS

| | | |
|---|---|---|
| 0595549 | 5/1994 | European Pat. Off. . |
| 3535791 | 5/1986 | Germany . |
| 39 35 364 C1 | 8/1990 | Germany . |
| 4105869 | 8/1992 | Germany . |
| 9216195 | 3/1993 | Germany . |
| 4311493 | 10/1994 | Germany . |
| 44 16 697 | 11/1995 | Germany ..................... G06K 19/077 |

OTHER PUBLICATIONS

Patent Abstract of Japan No JP6336096 published Dec. 6, 1994.

*Primary Examiner*—Leo P. Picard
*Assistant Examiner*—John B. Vigushin
*Attorney, Agent, or Firm*—Horst M. Kasper

[57] ABSTRACT

A chip card consists of a chip support assembly and a coil support assembly which are combined by an electrically conducting adhesive material (7). The chip support assembly has a contact-face support element (2) electrically connected to at least one electronic chip (5) which is connected to the electrically conducting adhesive material (7). The coil support element B has a carrier foil (1) with one or several coils (9) for a contact-free transfer of energy and data to the card terminal apparatus. Electrically conducting faces (3) are connected to the coils (9) and are attached to the electrically conducting adhesive material (7).

18 Claims, 1 Drawing Sheet

CHIP CARD WITH CHIP SUPPORT ELEMENT AND COIL SUPPORT ELEMENT

BACKGROUND OF THE INVENTION

1. Field of the Invention

The invention relates to chip cards with a chip support element with at least one chip and a coil support element with at least one coil for the contact-free transfer of energy and data to a card terminal apparatus as well as a method for the production of such chip cards.

2. Brief Description of the Background of the Invention Including Prior Art

Chip cards (combination chip cards, hybrid cards) have become known from the German printed patent document DE 39 35 364, which chip cards can exchange energy and data both free of contacts as well as with operating contacts with their terminal apparatus (read apparatus/write apparatus). These cards can be employed for multiple applications such as, for example, telephone cards, health cards, access control cards. These cards can be employed for multiple applications such as, for example, telephone cards, health cards, access control cards.

According to the state of the art, contact-free operating chip cards are produced by connecting a chip fixedly to the coil support element and subsequently embedding the chip at the card producer as a complete device component into the plastic material of a card. This is associated with the disadvantage that fairly large and mechanically sensitive device components (chip+foil with coil) have to be transported to the card producer. In addition, card bodies cannot be manufactured in advance at the card producer, since the device component which contains chip and foil with coil has to be entered into the card body prior to the production of a card (for example, a card with imprint).

An integrated circuit card (IC card) and a method for its production has become known from the German printed patent document DE 41 05 869 A1, wherein conductor-path net, induction coils, and contact faces are placed on one side without cross-over onto an integrated circuit card (IC card) or, respectively, onto a support of the semiconductor chip. Antenna paths are formed by conductor paths on a flexible foil in the same way as the externally accessible contacts are realized on this foil. The integrated circuit chips (IC chips) are disposed on the support and are in each case surrounded by a stiffening collar. The chip itself is connected through bonding wires to the contact locations on the foil.

It is known from the European printed patent document EP 0 595 549 A2 to connect electrically and mechanically a chip with a coil-shaped conductor-path structure on a foil by applying an electrically conducting adhesive on the contact locations. Upon bringing together the chip with the foil, the contacts disposed on the surface of the chip are electrically connected to the conductor paths.

SUMMARY OF THE INVENTION

1. Purposes of the Invention

It is an object of the invention to provide for the mounting of chip cards with their different electronic function elements in a simple way, as well as, on the one hand, to produce the card bodies independent of the chip assembly and, on the other hand, to mount the chips behind the contact faces and to be able to produce the chip cards in a series production as is the case with pure contact cards, and to render the two modules, namely the chip support element and the coil support element separately testable, including their later conducting connection.

These and other objects and advantages of the present invention will become evident from the description which follows.

2. Brief Description of the Invention

The solution of the object according to an invention comprises a chip card containing the two parts, chip support element and coil support element, wherein the chip support element is comprised of a contact-face support element. The contact-face support element is electrically connected to at least one electronic chip and exhibits contact faces, accessible from the outside, providing card contacts for connecting the chip to contacts in a card terminal apparatus. The chip is disposed on the side of the chip support element disposed remote from the contact faces. The coil support element comprises a carrier foil, which carrier foil carries one or several coils for the contact-free transfer of energy and data to the card terminal apparatus. In addition, electrically conducting materials are adheringly applied on the contact-face support element on the side facing toward the coil support element. The electrically conducting materials are connected electrically conducting to the chip. Electrically conducting faces, connected to the coils, are provided on the carrier foil at the locations where the electrically conducting materials are resting oppositely on the contact-face support element such that the chip support element, brought together with the coil support element, produces an electrical connection between the coils and the chip of the chip support element by way of the electrically conducting materials. In this way, the chip card is capable to operate both as a contact-free card with the aid of the coil connections as well as, if desired, as a contact-associated card with the aid of the contacts.

According to the invention, the object is also obtained to connect electrically chip cards, which do not contain contact elements, without an additional process step to their function elements chip and coils. In such a chip card there are in addition electrically conducting materials adheringly applied and electrically conductingly connected to the chip at the chip support element on the side facing toward the coil support element. The chip card comprises the two parts, chip support element and coil support element. The chip support element is electrically connected to at least one electronic chip. The coil support element includes a carrier foil, which carrier foil supports one or several coils for the contact-free transfer of energy and data to a card terminal apparatus. The chip is disposed on the side of the chip support element facing toward the coil support element. In addition, electrically conducting materials are adheringly applied on the chip support element on the side facing toward the coil support element. The electrically conducting materials are connected electrically conducting to the chip. Electrically conducting faces, connected to the coils, are provided on the carrier foil at the locations where the electrically conducting materials are resting oppositely on the chip support element, such that the chip support element, brought together with the coil support element, produces an electrical connection between the coils and the chip by way of the electrically conducting materials. In this way, the chip card is capable of operating as a contract-free card with the aid of the coil connections.

According to the invention, it is possible to produce the two essential parts, chip support element and coil support element B, timely independently from each other and to join the chip support element and the coil support element together in the following in a single process step. According to this method, it is possible to produce chip cards with their plastic part in volume for tests purposes, for example with graphic representation, imprints, independently of the embedding of the expensive chips. In addition, the placing of the chips behind the contact faces is made possible in the same way as it is also in the case of pure contact chip cards according to the state of the art, which pure contact chip cards do not contain coils.

According to the invention, this method is a method for the production of chip cards, which chip cards contain after their production essentially a chip support element and a coil support element. The chip support element, which is to be embedded into the card material of the chip card, exhibits contact faces and, below the contact faces, at least one chip. The chip is electrically conductingly connected to the contact faces. Electrically conducting materials are adheringly attached at the chip support element, which electrically conducting materials are connected electrically conducting to contact locations of the chips. Electrically conducting faces are later disposed on the part B opposite to the locations of the electrically conducting materials. Separate therefrom, the coil support element carries conductor paths on an arbitrary side in the shape of one or several coils. The faces produce electrical, galvanic connections to the coils. The coil support element and the chip support element, which can be produced in different production processes at different times, are brought together such that the electrically conducting materials, which are already connected electrically conducting to the chip, produce an electrically conducting connection between the coils, the coil support element and the chip support element and from the coils, the coil support element and the chip support element to the chip of the chip support element.

In addition, this method according to the invention presents a method for the production of chip cards, where the chip cards contain after their production essentially a chip support element and a coil support element. The chip support element, which is to be embedded into the card material of the chip card, exhibits contact faces and at least one chip below the contact faces. The chip is connected electrically conductingly to the contact faces and the chip includes contact positions. Separate therefrom, the coil support element carries conductor paths on a desired side in the shape of one or several coils. The coil support element exhibits faces, facing the part A, which faces produce the electrical, galvanic connections to the coils. Electrically conducting materials are adheringly attached to the faces and the electrically conducting materials are connected electrically conductingly to the coils. The contact positions of the chips are later disposed on the chip support element opposite to the locations of the electrically conducting materials. The coil support element and the chip support element, which can be produced in different production processes at different times, are brought together such that the electrically conducting materials, which are already connected electrically conductingly to the chip, produce an electrically conducting connection between the coils, the coil support element and the chip support element and from the coils, the coil support element and the chip support element to the chip of the chip support element.

The invention makes it possible to produce chip cards with a plastic part in volume for test purposes, for example with a graphic structure such as imprint, independent of the embedding of the expensive chips. Furthermore, the placing of the chips behind the contact faces is rendered possible in the same way as is the case also with pure contact chip cards, which do not contain any coils. The two essential parts, namely the chip support element and the coil support element, can be produced by methods timely independent from each other and the chip support element and the coil support element can be joined in the following in a single process step.

According to this, it is possible to produce card bodies, i.e. plastic materials, independent of the chip mounting and to test imprints and production of the cards without an entering of the chips. In addition, it is possible to mount chips, as with pure contact cards, behind the contact faces and to produce them in series production. This lowers the costs for the production of cards which combine contact-free and contact-associated properties.

In addition, the methods according to the invention present the advantage that the parts, chip support element and coil support element, can be produced in different production processes and at different times, whereby it becomes possible to produce card bodies, i.e. plastic materials, independent of the chip mounting and to test imprints and production of the cards without an entering of the chips. In addition, it is possible to mount chips, as in the case of pure contact cards, behind the contact faces and to produce the chips in series production. The advantages associated therewith is that the chip support element and the coil support element including their later conducting connection can be tested relative to their electrical functioning separately together with the electrically conducting materials prior to the joining, such that the two parts, chip support element and coil support element, can be separately produced in order to be only joined together in the following, where the conducting connection is formed by the electrically conducting materials disposed between the chip support element and the coil support element after the joining of the chip support element and the coil support element.

In addition, the invention is associated with the advantage that the coil or coils of the coil support element B do no longer have to be bonded through.

The volume or shape of the electrically conducting materials can also be employed in order to maintain or generate different predetermined distances between the chip support element and a coil support element. The materials can be selectively applied to the carrier foil or to the electrically conducting faces of the coil support element. The selected method can be adapted to the respective production requirements.

If the electrically conducting material can be deformed during heating and/or application of pressure during the bringing together of chip support element A and coil support element, the temperature or pressure or another kind of energy feed can be employed for determining the deformation of the distance between chip support element and coil support element. The electrically conducting material can be employed as an adhering connection between the chip support element and the coil support element, in order to make an undesired separation of the parts after assembly difficult. The security of the chip card relative to a demounting of the chips is thereby increased.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which is shown one of the various possible embodiments of the present invention.

DESCRIPTION OF INVENTION AND PREFERRED EMBODIMENTS

Figure 1A:
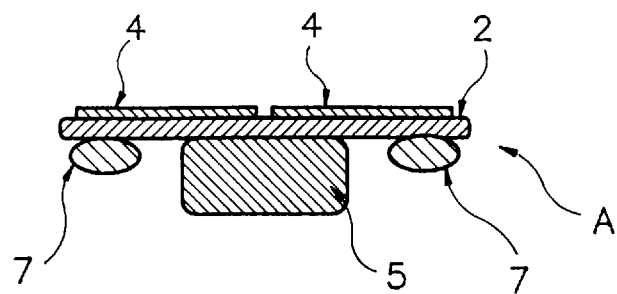
FIG. 1a is a chip support assembly shown schematically.
Figure 1B:
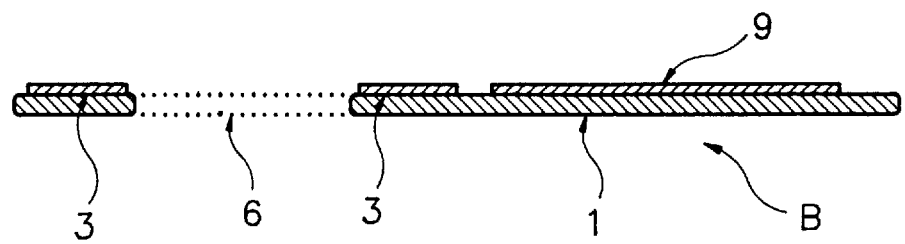
FIG. 1b is a coil support assembly shown schematically.

FIGS. 1a and 1b shows schematically the two parts chip support element (FIG. 1a) and coil support element (FIG. 1b). The chip support element (FIG. 1a) is comparable in its shape to the present-day contact elements, as they are for example produced for telephone cards and also other chip cards. The chip support element (FIG. 1a) contains the chip 5 on the one side of a contact-face support element 2. The contact faces 4 are resting on the second side and form the connection to the contacts in the card terminal apparatus (terminal). In addition, electrically-conducting materials 7 are applied adheringly at the elements 2. These materials are connected conductingly to the contact locations of the chip 5.

The coil support element (FIG. 1b) shows schematically the foil 1, where one or several coils 9 are placed at the coil support element (FIG. 1b), for example as printed conductor paths. The hole 6 can be recognized, which is produced for example by a punching. Furthermore, the faces 3 are recognized which generate an electrical galvanic connection to the coils 9.

Figure 2:
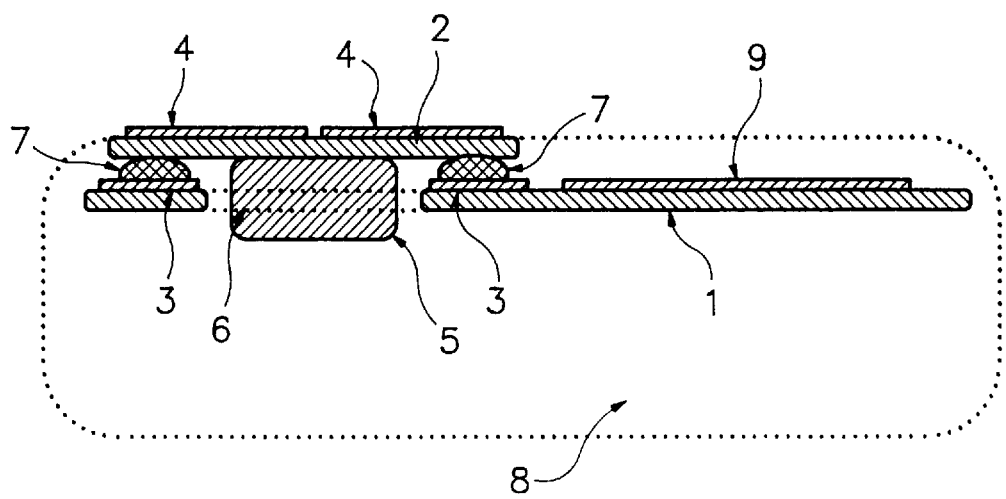
FIG. 2 are the chip support assembly and the coil support assembly combined together shown schematically.

FIG. 2 shows schematically the combined parts, chip support element (FIG. 1a) and coil support element (FIG. 1b). It can be recognized that the chip 5 fits precisely through the hole of the foil 1 and thus a height-level difference between the chip 5 and the distance between the contact-face support element 2 and the coil support element (FIG. 1b) is balanced.

Preferred Embodiment of the Invention

A chip card according to the invention contains the two parts chip support element (FIG. 1a) and coil support element (FIG. 1b). Thereby chip cards are described which employ both contacts as well as coils for the contact-free transfer of energy and data (according to the German printed patent document DE 39 35 364). The chip support element (FIG. 1a is to be embedded into the material 8 of a chip card. One or several chips 5 are applied at this chip support element (FIG. 1a) below the contact faces 4. The chip 5 or the chips 5 are electrically conductingly connected to the contact faces 4 according to conventional methods, for example, bonding. In addition, according to the invention, electrically conducting materials 7 are adheringly applied at the contact-face support elements 2. According to the invention, these materials form an electrical connection to the connection positions of the chips, at which connection positions of the chips the coils have their connectors for the purpose of contact-free energy coupling and data coupling (from an external card terminal apparatus).

The coil support element (FIG. 1b) comprises an (insulating) carrier foil 1 which carries on an arbitrary side conductor paths in the shape of one or several coils 9. In addition, electrically conducting faces 3, connected with the coils 9, are provided on the foil 1 at the locations where the conducting materials 7 are resting on the chip support element (FIG. 1a). If the parts, chip support element (FIG 1a) and coil support element (FIG. 1b), which can be produced in different production processes at different times, are now brought together during the card production, the materials 7 electrically connect the coils 9 through the contact-face support elements 2 with the inputs of the chip 5 or of the chips 5. According to this description for patent purposes, it is possible to produce card bodies, i.e. plastic materials 8, independent from the chip mounting and to test the imprints of the cards and the production of the cards without entry of the chips. In addition, it is possible to mount chips, like in pure contact cards, behind the contact faces, and to produce them in a series production. Thereby the costs for the production of cards, which combine contact-free and contact-associated properties, are lowered.

A hole 6 is disposed on the foil 1 at the position at which the chip 5 is resting on the chip support element (FIG. 1a). A possible height-level difference between the chip 5 and the conducting material 7 can be balanced upon bringing together the parts, chip support element (FIG. 1a) and coil support element (FIG. 1b), by leading the chip 5 through the hole 6.

The materials 7 can be applied as desired on the foil 1 or on the faces 3. The selected application can be adapted to the respective production requirements.

The volume or the shape of the materials 7 can also be employed in order to maintain or to generate different predetermined distances between the foil 1 and the contact-face support element 2.

If the material 7 can be deformed during heating and/or under pressure during the bringing together of the parts, chip support element (FIG. 1a) and coil support element B, the temperature or the pressure or a different kind of energy feed can be determined for deforming the distance between chip support element A and coil support element B.

The material 7 can be employed as an adhering connection between the parts, chip support element A and coil support element (FIG. 1b), in order to render an undesired separation of the parts after mounting difficult. The safety of the cards is thereby increased relative to a demounting of the chips.

The bringing together of the two parts, chip support element (FIG. 1a) and coil support element (FIG. 1b) according to the patent application, and also be of an advantage if the chip support element (FIG. 1a) does not contain contact faces and thus also no known connection between chip and contact faces and the chip support element (FIG. 1a) is present. In this case, the material 7 can be employed as a connection material for the attachment of the coils. An additional process step, such as soldering or bonding, is not required.

It will be understood that each of the elements described above, or two or more together, may also find a useful application in other types of chip cards differing from the types described above.

While the invention has been illustrated and described as embodied in the context of a chip card consisting of a chip support element and a coil support element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A chip card comprising:

a chip support assembly having a first side and having a second side and having a contact-face support element (2) electrically connected to at least one electronic chip (5), adhering and electrically conducting adhesive materials (7) attached to the contact-face support element (2) and electrically connected to the electronic chip (5), contact faces (4) attached to the contact-face support element (2) and being accessible from the outside and furnishing card contacts for connecting the electronic chip (5) to contacts in a card terminal apparatus, wherein the electronic chip (5) is disposed on the second side of the chip support assembly disposed oppositely relative to a side with the contact faces (4); and a coil support assembly having a carrier foil (1) with one or several coils (9) for a contact-free transfer of energy and data to the card terminal apparatus, electrically conducting faces (3) connected to the coils (9) and disposed at locations matching locations of the adhering and electrically conducting adhesive materials (7) adheringly attached to the contact-face support element (2), wherein the adhering and electrically conducting adhesive materials (7) produce an electrical connection between the coils (9) and the electronic chip (5) when the chip support assembly is brought together with the coil support assembly and wherein the chip card is capable of operating both as a contact-free card with the aid of coil connections as well as, if desired, as a contact-associated card with the aid of the contact faces (4).

2. The chip card according to claim 1, wherein the carrier foil (1) contains a hole (6) at that location where the electronic chip (5) rests on the chip support assembly.

3. The chip card according to claim 1, wherein the electrically conducting adhesive materials (7) are placed on the carrier foil (1) and/or on the electrically conducting faces (3).

4. The chip card according to claim 1, wherein the electrically conducting adhesive materials (7) are employable for maintaining a distance between the carrier foil (1) and the contact-face support element (2) based on their volume and form.

5. The chip card according to claim 4, wherein the electrically conducting adhesive materials (7) are deformable upon heating and/or under pressure when the chip support assembly and the coil support assembly are brought together, and wherein a distance between the chip support assembly and the coil support assembly is thereby determined.

6. The chip card according to claim 1, wherein the electrically conducting adhesive materials (7) produce an adhering connection between the chip support assembly and the coil support assembly, and wherein a separating of the chip support assembly and the coil support assembly after combining is thereby rendered difficult.

7. A chip card comprising a coil support assembly comprising a carrier foil (1) supporting one or several coils (9) for a contact-free transfer of energy and data to a card terminal apparatus and electrically conducting faces (3) connected to the coils (9);

a chip support assembly with at least one chip (5) disposed on a side of the chip support assembly facing toward the coil support assembly, wherein the chip support assembly is brought together with the coil support assembly;

electrically conducting adhesive materials (7) adheringly applied on the chip support assembly on a side disposed facing toward the coil support assembly and disposed at locations matching locations of the electrically conducting faces (3), wherein the electrically conducting adhesive materials (7) are connected electrically to the electronic chip (5), and wherein the electrically conducting adhesive materials (7) produce an electrical connection between the coils (9) and the electronic chip (5) when the chip support assembly is brought together with the coil support assembly and wherein the chip card is capable of operating as a contact-free card with the aid of coil connections.

8. A method for the production of chip cards comprising the following steps:

embedding a chip support assembly and contact faces (4) into a card material (8);

mounting at least one chip (5) below the contact faces (4);

connecting the chip (5) to the contact faces (4); adheringly attaching electrically conducting adhesive materials (7) to the chip support assembly;

connecting the electrically conducting adhesive materials (7) to contacts of the chip (5);

manufacturing a coil support assembly with one or several coils (9);

depositing electrically conducting faces (3) onto the coil support assembly at locations matching locations of the electrically conducting adhesive materials (7); furnishing electrical connections to the coils (9); and bringing the coil support assembly and the chip support assembly together for producing an electrical connection between the coils (9), the coil support assembly and the chip support assembly and from the coils (9), the coil support assembly and the chip support assembly to the chip (5) of the chip support assembly.

9. A method for the production of chip cards comprising the following steps:

embedding a chip support assembly and contact faces (4) into a card material (8);

mounting at least one chip (5) to the chip support assembly below the contact faces (4);

electrically connecting the chip (5) to the contact faces (4), and wherein the chip (5) includes contact positions;

furnishing conductor paths in a shape of one or several coils (9) and electrically conducting faces (3) connected to the coils (9) on a coil support assembly;

adheringly attaching electrically conducting adhesive materials (7) to the electrically conducting faces (3);

connecting the electrically conducting adhesive materials (7) to the coils (9);

bringing the coil support assembly and the chip support assembly together for producing an electrically conducting connection between the coils (9), the coil support assembly and the chip support assembly and from the coils (9), the coil support assembly and the chip support assembly to the chip (5) of the chip support assembly.

10. A chip card comprising a chip support assembly including
a contact-face support element having a first side and having a second side, contact faces disposed on the first side of the contact-face support element and accessible from the outside for furnishing card contacts, and enabling the contact-face support element to operate as a contact-associated card with the aid of the contact faces, an electronic chip disposed on the second side of the contact-face support element and electrically connected to the contact faces thereby enabling the electronic chip to connect to a contact means in a card terminal apparatus, wherein the chip is disposed on a side of the chip support assembly disposed remote from the contact faces, electrically conducting adhesive material attached on the second side of the contact-face support element and connected electrically conducting to the electronic chip; and a coil support assembly including
- a carrier foil having a first side and having a second side,
- a coil carried by the carrier foil and furnishing a contact-free transfer of energy and data to the card terminal apparatus, wherein the coil allows the chip support assembly to operate as a contact-free card with the aid of the coil,
- electrically conducting faces disposed on the first side of the carrier foil and connected to the coil, wherein positions of the electrically conducting faces on the carrier foil are facing directly the locations wherein the electrically conducting adhesive material is resting on the contact-face support element, wherein the chip support assembly contacting the coil support assembly, produces an electrical connection between the coil and the chip of the chip support assembly by way of the electrically conducting adhesive material contacting the electrically conducting faces.

11. The chip card according to claim 10, wherein the carrier foil contains a hole at that location where the chip rests on the chip support assembly.

12. The chip card according to claim 10, wherein the electrically conducting adhesive material is placed on the electrically conducting faces.

13. The chip card according to claim 10, wherein the electrically conducting adhesive material is employed for maintaining a distance between the carrier foil and the contact-face support element based on volume and form of the electrically conducting adhesive material.

14. The chip card according to claim 13, wherein the electrically conducting adhesive material is deformable upon heating and/or under pressure during bringing the chip support assembly and the coil support assembly together, and wherein a distance between the chip support assembly and coil support assembly is thereby determined.

15. The chip card according to claim 10, wherein the electrically conducting adhesive material produces an adhering connection between the chip support assembly and the coil support assembly, and wherein a separating of the chip support assembly from the coil support assembly after mounting is thereby rendered difficult.

16. A chip card comprising
an electronic chip,
a chip support assembly having a first side and having a second side and electrically connected to the electronic chip, wherein the electronic chip is disposed on the second side of the chip support assembly;
an electrically conducting adhesive material attached to the second side of the chip support assembly; and a coil support assembly having a first side and having a second side, wherein the chip support assembly is disposed on the first side of the coil support assembly, and including
a carrier foil,
a coil supported by the carrier foil and for furnishing a contact-free transfer of energy and data to a card terminal apparatus, wherein the second side of the chip support assembly faces toward the coil support assembly, and wherein the electrically conducting adhesive material is connected electrically conducting to the electronic chip, electrically conducting faces connected to the coil and furnished on the first side of the carrier foil at locations, where the electrically conducting adhesive material is resting on the chip support assembly at locations facing the electrically conducting faces, wherein the chip support assembly, attached to the coil support assembly, produces an electrical connection between the coil and the electronic chip through the electrically conducting adhesive material, whereby the coil support assembly is capable of operating as a contact-free card with the aid of the coil connections.

17. A method for the production of chip cards, employing a chip support assembly exhibiting contact faces and a chip disposed below the contact faces;

embedding the chip support assembly into a card material of a chip card;

connecting the chip electrically conducting to the contact faces;

adheringly attaching an electrically conducting adhesive material to the chip support assembly;

connecting the electrically conducting adhesive material in an electrically conducting way to contact locations of the chip;

placing electrically conducting faces on a coil support assembly at locations disposed opposite to the locations of the electrically conducting adhesive material;

applying conductor paths in a shape of a coil on the coil support assembly on a desired side, and wherein the electrically conducting faces furnish electrical, galvanic connections to the coil;

bringing the coil support assembly and the chip support assembly together for placing the electrically conducting adhesive material in contact with the electrically conducting faces, wherein the electrically conducting adhesive material is already connected electrically conducting to the chip for producing an electrically conducting connection between the coil, the coil support assembly and the chip support assembly and from the coil, the coil support assembly, and the chip support assembly to the chip of the chip support assembly, and wherein the chip card contains after its production essentially the chip support assembly and the coil support assembly.

18. A method for the production of chip cards comprising the steps:

employing a chip support assembly;

embedding the chip support assembly into a card material of a chip card, wherein the chip support assembly exhibits contact faces and at least one chip disposed below the contact faces;

connecting the chip electrically conductingly to the contact faces, and wherein the chip includes contact positions; separately from the preceding steps placing a conductor path in a shape of coils onto a desired side of a coil support assembly, wherein the coil support assembly exhibits faces, facing toward the chip support assembly, and wherein the faces produce electrical, galvanic connections to the coils;

adheringly attaching electrically conducting adhesive material to the faces;

connecting the electrically conducting adhesive material electrically conductingly to the coils;

disposing at a later point in time the contact positions of the chips on the chip support assembly on places facing the locations of the electrically conducting adhesive material;

bringing the coil support assembly and the chip support assembly together such that the electrically conducting adhesive material, which is already connected electrically conductingly to the chip, produces an electrically conducting connection between the coils, the coil support assembly, and the chip support assembly and from the coils, the coil support assembly, and the chip support assembly to the chip of the chip support assembly, and wherein the chip card contains after its production essentially the chip support assembly and the coil support assembly.

* * * * *

UNITED STATES PATENT AND TRADEMARK OFFICE
CERTIFICATE OF CORRECTION

PATENT NO : 6,008,993
DATED : December 28, 1999
INVENTOR(S): Hans-Diedrich Kreft

It is certified that error appears in the above-identified patent and that said Letters Patent is hereby corrected as shown below:

On the title page, item [73] Assignee, line 1:
should read -- Angewandte Digital Electronik GMBH--.

Signed and Sealed this

Twentieth Day of February, 2001

Attest:

NICHOLAS P. GODICI

Attesting Officer

Acting Director of the United States Patent and Trademark Office